B. ILLINGWORTH.
Churn.
No. 57,913.
Patented Sept. 11, 1866.
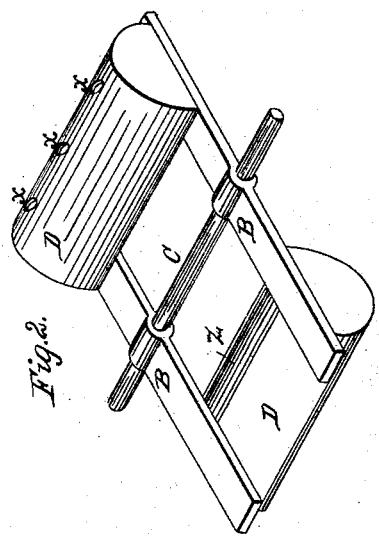
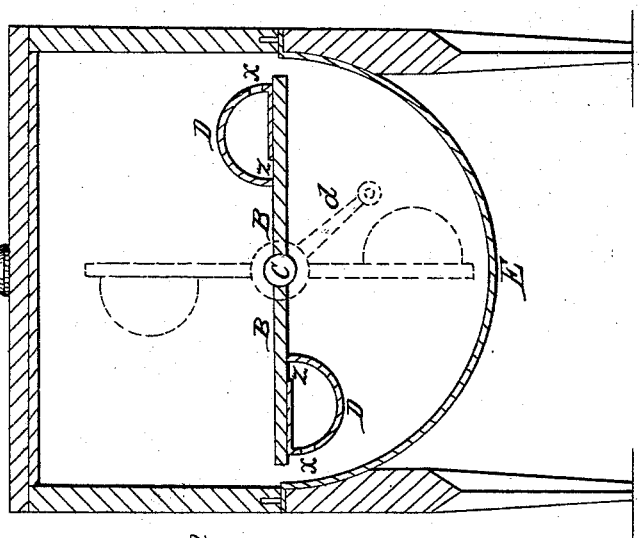
Witnesses:
A. A. Yeatman
Charles Alexander
Inventor:
B. Illingworth
per
Alexander & Nicholson
Attorney

UNITED STATES PATENT OFFICE.

B. ILLINGWORTH, OF FREEPORT, ILLINOIS.

IMPROVEMENT IN CHURNS.

Specification forming part of Letters Patent No. 57,913, dated September 11, 1866.

*To all whom it may concern:*

Be it known that I, B. ILLINGWORTH, of Freeport, Stephenson county, Illinois, have invented certain new and useful Improvements in Churns; and I do hereby declare that the following is a full, clear, and exact description of the same, reference being had to the accompanying drawings and the letters of reference marked thereon, making a part of this specification.

Figure 1 represents a longitudinal vertical section. Fig. 2 is a perspective view of the churn-dasher.

In the annexed drawings, A represents the churn-box, which is made of any suitable shape, provided with legs, and having a semicircular metallic bottom, E. C is a horizontal shaft, having a crank, $d$, at the outer end, and upon which are secured apart the arms B B. At each end of the arms B B are attached the buckets D, which lie horizontally on the arms, and are secured on the said arms at opposite sides from each other. These buckets are made semicircular in form, with their flat surfaces resting upon the arms B B, and can be either of metal or wood.

$z$ represents an oblong slot in the buckets, which allows the air to pass, while $x\ x\ x$ represent circular openings on their outer faces, through which the air is forced out.

In the operation of churning, it will be seen that the action of the arms and buckets upon the cream constantly diffuses a current of air through the box. The crank $d$ is turned after the cream is placed in box A. Then the opening $z$ is at the top, and when the forward bucket enters and forces the air out the openings $x$. As the buckets leave the cream it (the cream) falls from out the opening $z$, and the other bucket is just entering. After the butter has been formed the operation of the buckets is reversed, causing the dasher to free itself of the butter formed upon it.

In this device the flat surfaces of the arms and buckets always act upon the cream, by which means, together with the atmospheric pressure, the butter is speedily formed.

Having thus fully described my invention, what I claim as new, and desire to secure by Letters Patent, is—

The arms B B, provided with the buckets D D, constructed as described, upon the shaft C, when arranged within the churn-box A, and operating in the manner substantially as and for the purposes specified.

As evidence that I claim the foregoing I have hereunto set my hand in the presence of two witnesses.

BENJAMIN ILLINGWORTH.

Witnesses:
 JAMES N. PROUTY,
 JOSEPH B. SMITH.